United States Patent
Gekht et al.

(10) Patent No.: US 10,030,581 B2
(45) Date of Patent: Jul. 24, 2018

(54) AIR INTAKE WITH SCROLL PORTION AND STRUTTED PORTION FOR GAS TURBINE ENGINE

(71) Applicant: Pratt & Whitney Canada Corp., Longueuil (CA)

(72) Inventors: Eugene Gekht, Brossard (CA); Francois Bisson, Vallee-Jonction (CA); Mark Cunningham, Montreal (CA); Michel Desjardins, St-Hubert (CA); Guo Rong Yan, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 338 days.

(21) Appl. No.: 15/052,189

(22) Filed: Feb. 24, 2016

(65) Prior Publication Data
US 2017/0241341 A1 Aug. 24, 2017

(51) Int. Cl.
*F02C 7/042* (2006.01)
*B64D 33/02* (2006.01)
(Continued)

(52) U.S. Cl.
CPC .............. *F02C 7/042* (2013.01); *B64D 33/02* (2013.01); *F02C 6/206* (2013.01); *F02C 7/04* (2013.01);
(Continued)

(58) Field of Classification Search
CPC . F02C 6/206; F02C 7/04; F02C 7/042; B65D 33/02; B65D 2033/0246; B65D 2033/0293; F05D 2250/51; Y02T 50/671
See application file for complete search history.

(56) References Cited

U.S. PATENT DOCUMENTS 4,240,250 A * 12/1980 Harris .................... F02C 7/045
415/119
4,286,430 A 9/1981 Smith
(Continued)

FOREIGN PATENT DOCUMENTS

EP 0385294 A1 9/1990
WO 2015055948 A1 4/2015

OTHER PUBLICATIONS

Dehns, Response to Extended European Search Report dated Jul. 25, 2017 re: application No. 17157985.7.
(Continued)

*Primary Examiner* — Igor Kershteyn
(74) *Attorney, Agent, or Firm* — Norton Rose Fulbright Canada LLP

(57) ABSTRACT

An air intake for efficiently channeling a flow of ambient air toward an air inlet of a turboprop or turboshaft gas turbine engine is disclosed. The air intake comprises an intake inlet for receiving the flow of air, an intake duct for channelling the flow of air, and an intake outlet for discharging the flow of air toward the air inlet of the gas turbine engine. The air intake may comprise a scroll portion and a strutted portion configured to receive the flow of air from the intake duct and channel the flow of air toward the intake outlet. The strutted portion may comprise one or more vanes for interacting with the flow of air. The intake duct may be oriented toward a flow direction of the air pushed aft by a propeller coupled to the gas turbine engine.

12 Claims, 11 Drawing Sheets

(51) Int. Cl.
*F02C 7/04* (2006.01)
*F02C 6/20* (2006.01)

(52) U.S. Cl.
CPC .......... *B64D 2033/0246* (2013.01); *B64D 2033/0293* (2013.01); *F05D 2250/51* (2013.01); *Y02T 50/671* (2013.01)

(56) References Cited

U.S. PATENT DOCUMENTS

| | | | |
|---|---|---|---|
| 4,617,028 A * | 10/1986 | Ray | F02C 7/05 55/306 |
| 4,928,480 A | 5/1990 | Oliver et al. | |
| 4,930,725 A * | 6/1990 | Thompson | B64C 11/14 244/53 R |
| 5,284,012 A * | 2/1994 | Laborie | B64D 33/08 244/53 B |
| 5,483,791 A * | 1/1996 | Kotwal | F02C 7/04 137/15.1 |
| 5,694,763 A | 12/1997 | Amelio et al. | |
| 5,725,180 A | 3/1998 | Chamay et al. | |
| 5,906,334 A * | 5/1999 | Chamay | B64D 33/02 244/53 B |
| 6,041,589 A * | 3/2000 | Giffin, III | F02K 3/075 60/226.1 |
| 6,279,322 B1 | 8/2001 | Moussa | |
| 6,302,647 B1 | 10/2001 | Schueler et al. | |
| 6,990,798 B2 * | 1/2006 | Bouchard | F02C 7/04 137/15.1 |
| 7,097,411 B2 | 8/2006 | Smoke et al. | |
| 7,597,283 B2 * | 10/2009 | Hernanz Manrique | B64D 41/00 244/53 B |
| 8,714,919 B2 * | 5/2014 | Gibson | F02C 7/04 415/184 |
| 9,719,424 B2 | 8/2017 | Teia Dos Santos Mendes Gomes | |
| 2005/0229605 A1 | 10/2005 | Bouchard et al. | |
| 2007/0134084 A1 | 6/2007 | Zausner | |
| 2015/0300254 A1 | 10/2015 | Stretton | |
| 2017/0211475 A1 | 7/2017 | Mayer et al. | |

OTHER PUBLICATIONS

English translation of European patent document No. EP 0385294A1 dated Sep. 5, 1990; https://www.google.ca/patents/EP0385294A1?dq=EP0385294&cl=en; accessed on Aug. 2, 2017.

Extended European Search Report dated Jul. 25, 2017 re: application No. 17157985.7.

English translation of International Patent No. WO 2015055948 dated Apr. 23, 2015, accessed on Aug. 2, 2017, https://www.google.ca/patents/WO2015055948A1?cl=en&dq=WO2015055948.

European Search Report dated Jul. 31, 2017 re: Application No. 17157978.2.

* cited by examiner

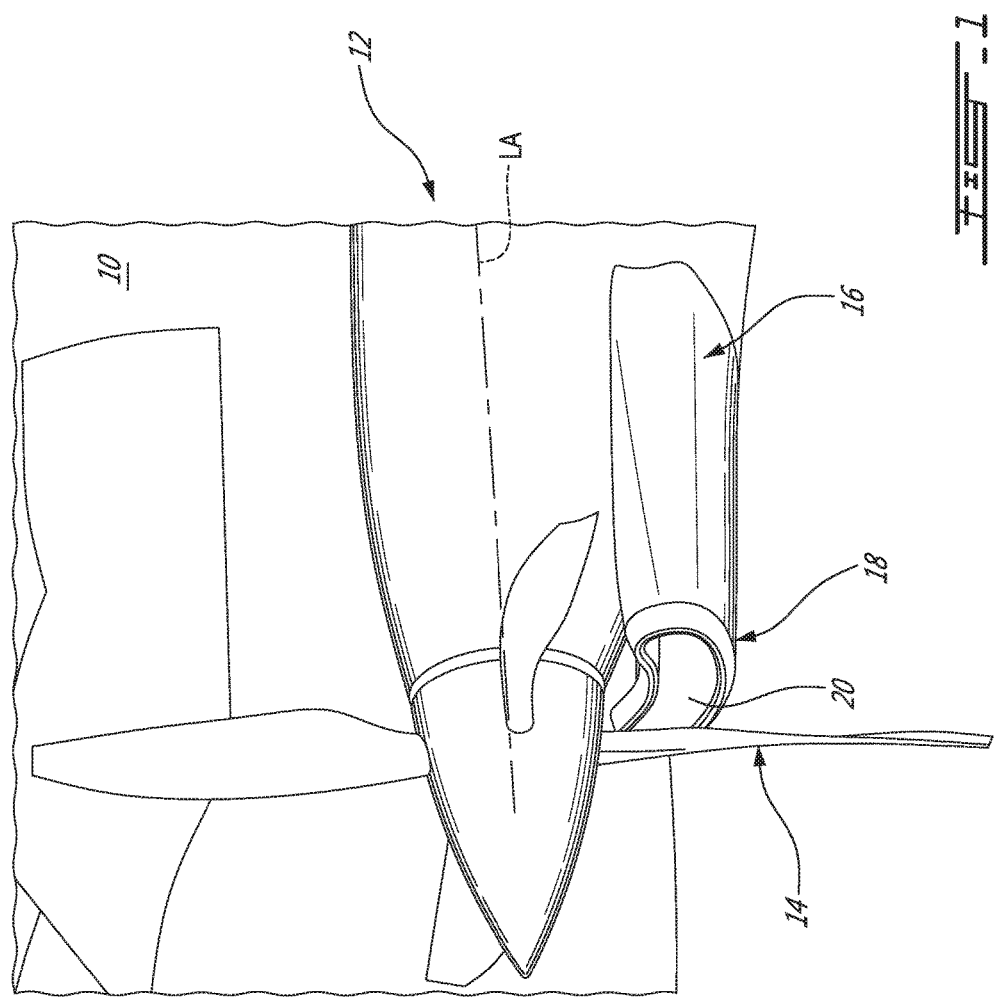

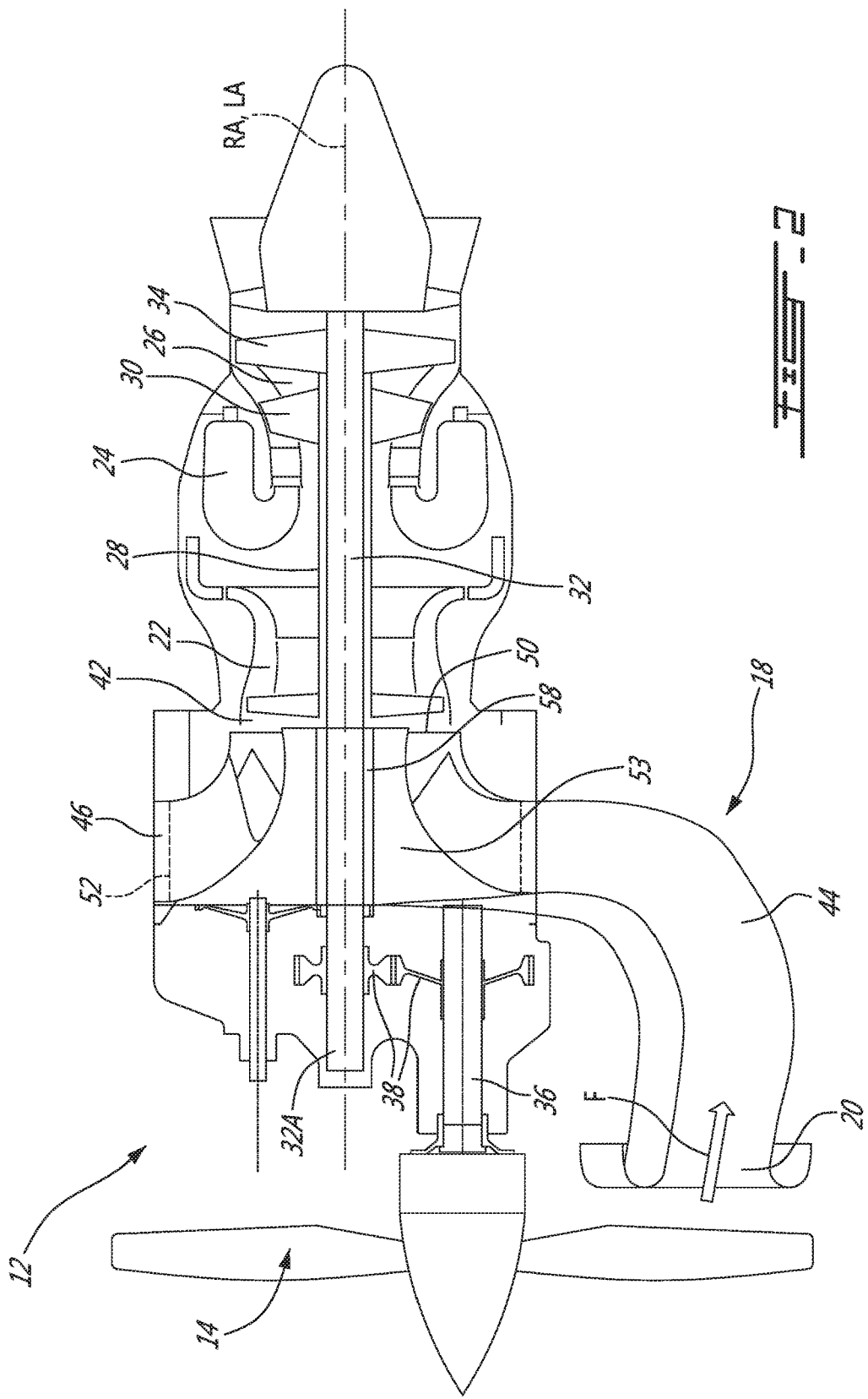

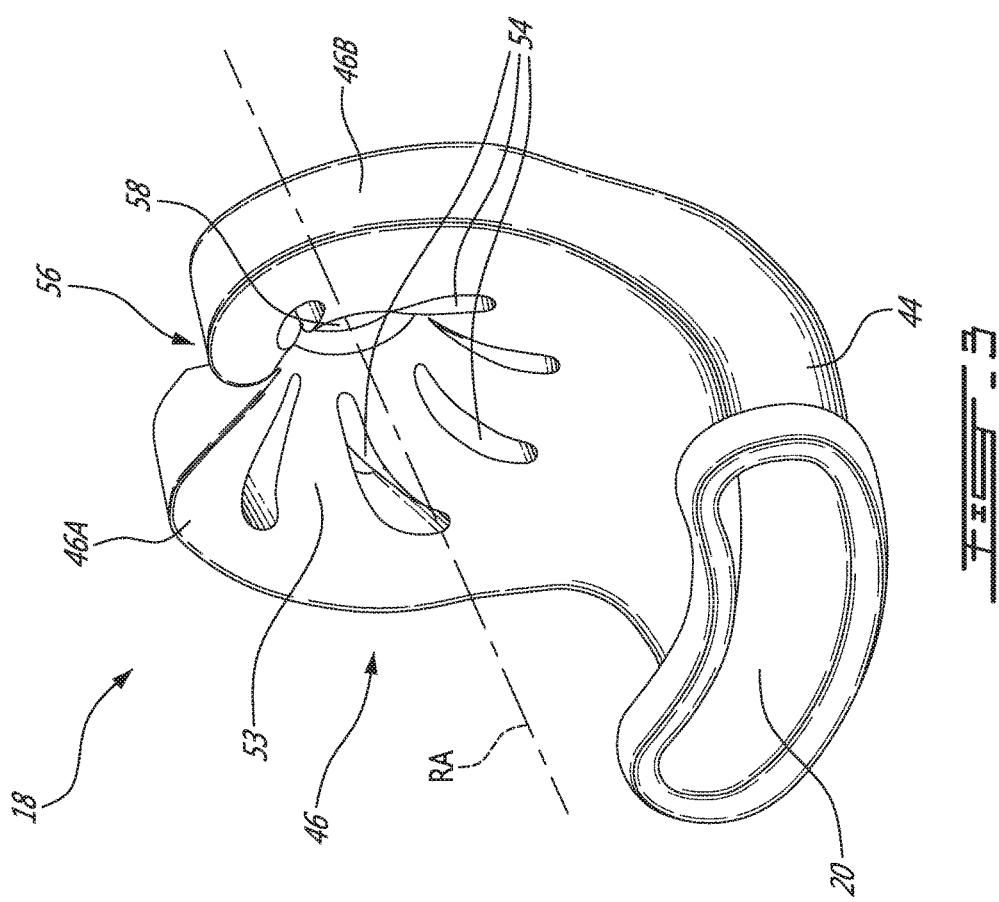

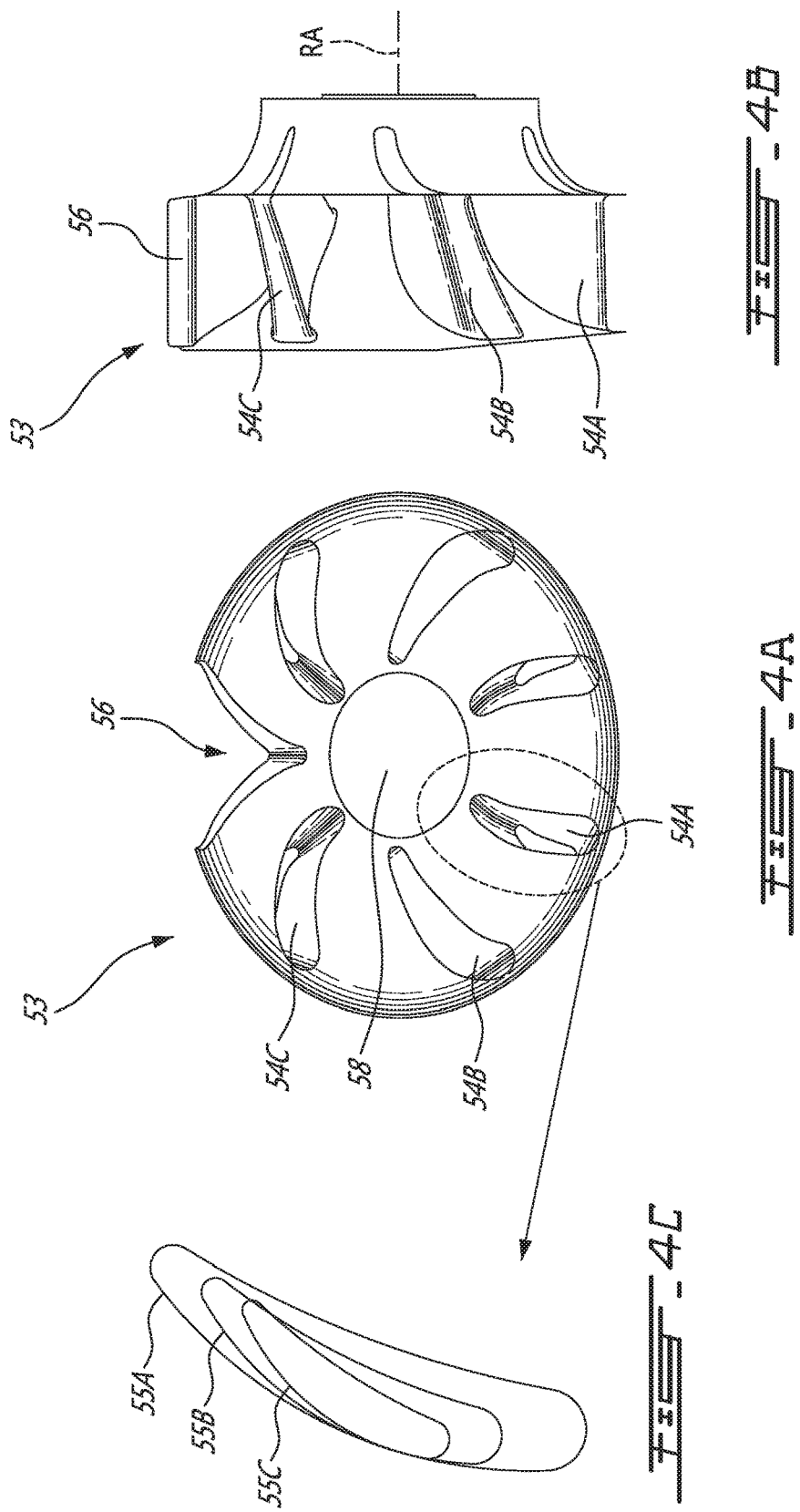

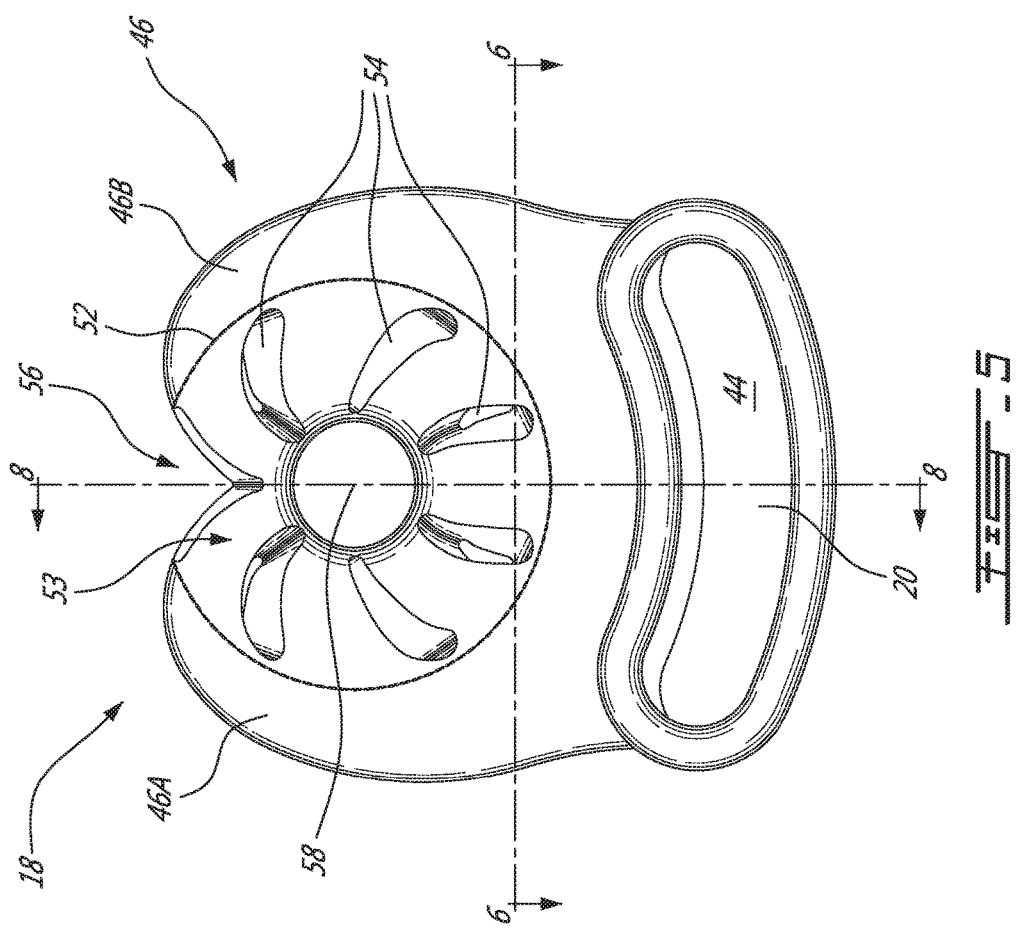

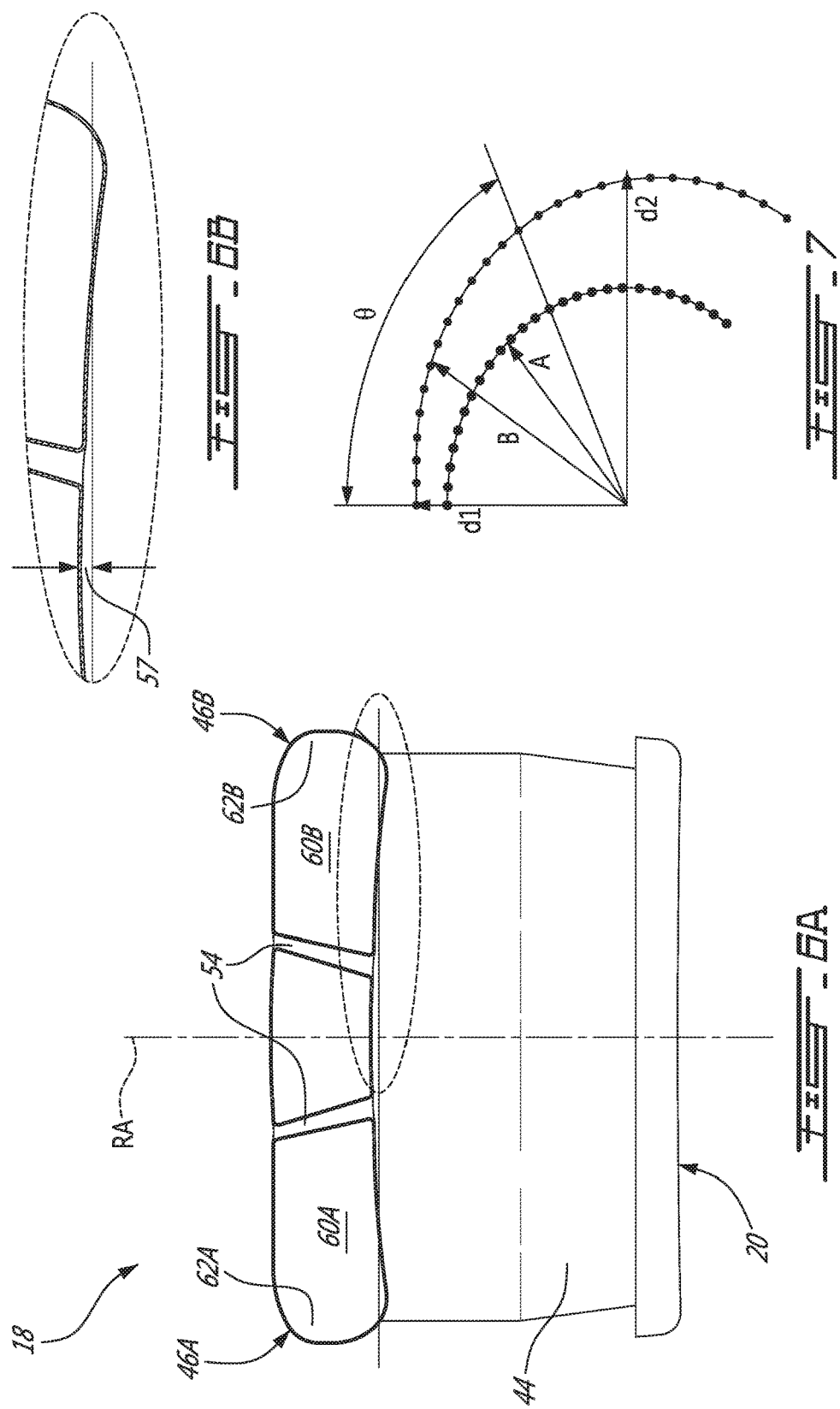

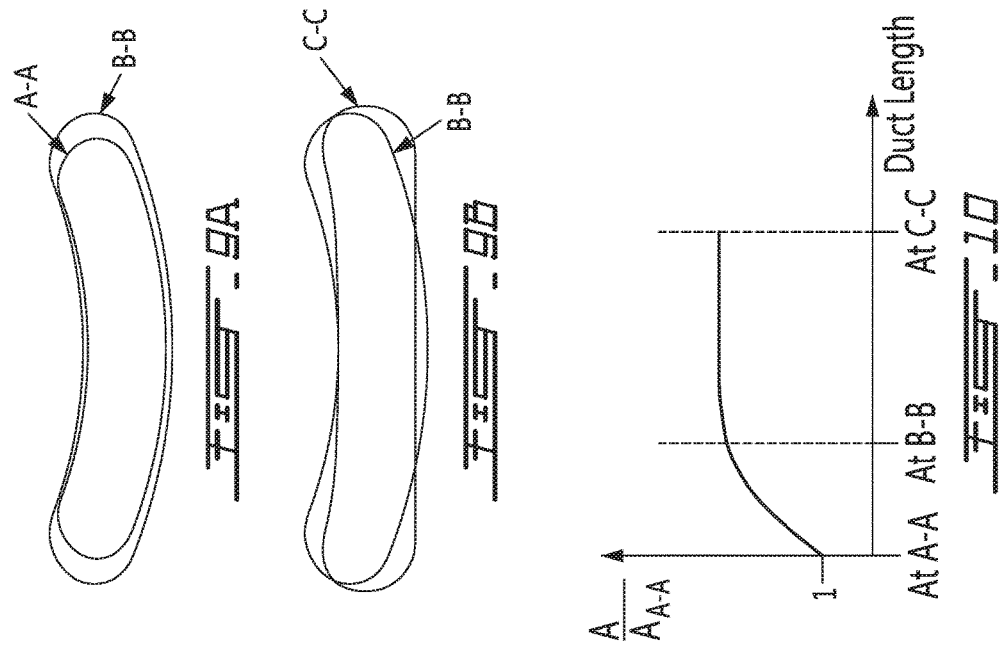
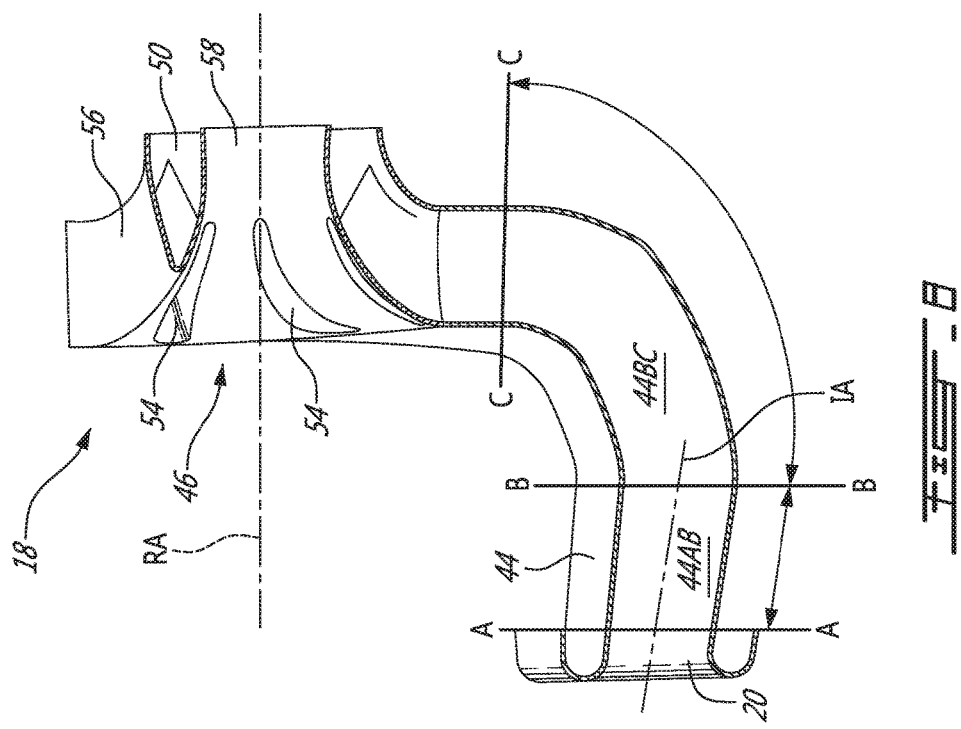

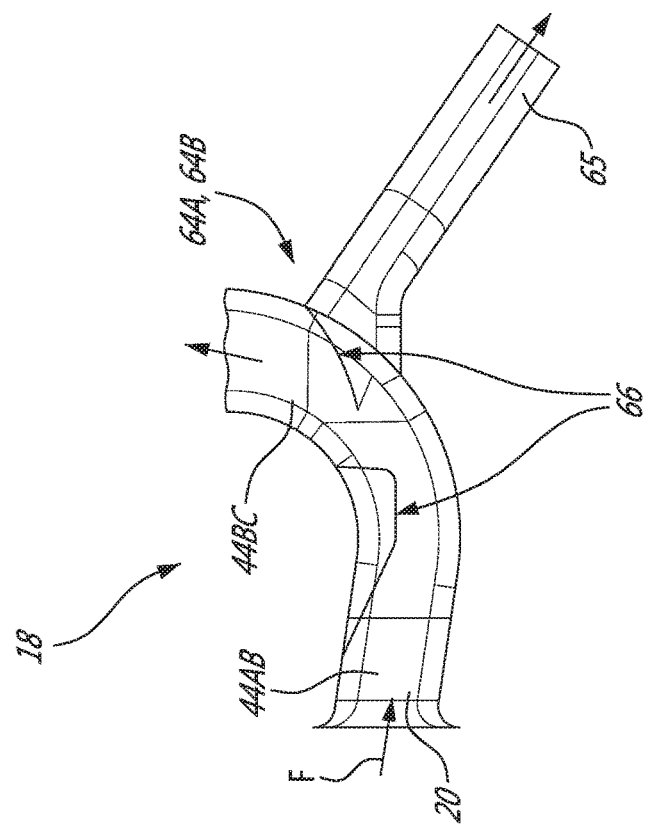
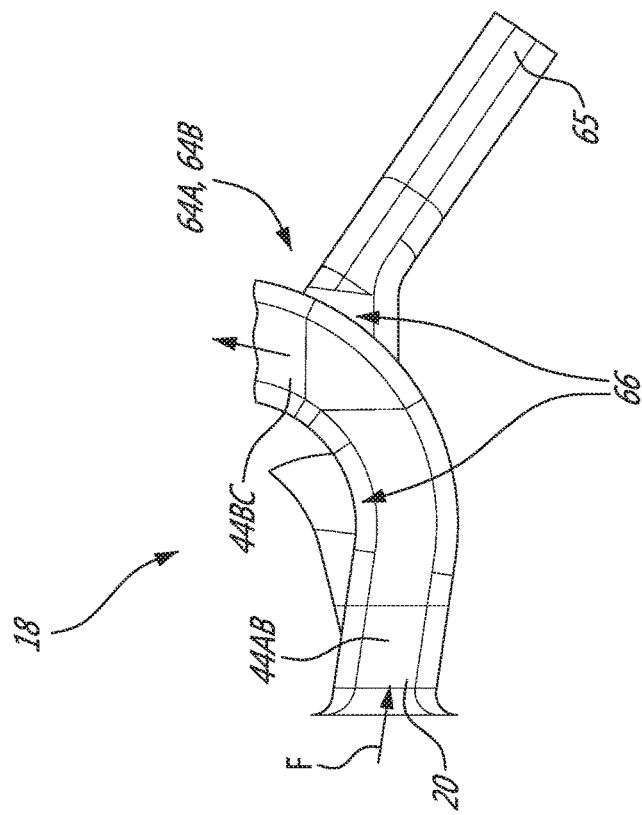

… (1)

AIR INTAKE WITH SCROLL PORTION AND STRUTTED PORTION FOR GAS TURBINE ENGINE

TECHNICAL FIELD

The disclosure relates generally to air intake systems for gas turbine engines, and more particularly to air intake systems for turboprop and turboshaft gas turbine engines.

BACKGROUND OF THE ART

A role of an air intake system on a gas turbine engine is to deliver ambient air to the compressor of the gas turbine engine. For turboshaft and turboprop engines used in aircraft applications, installation constraints often lead to air intakes having complex shapes that include bends and large plenums. These complex shapes can cause energy losses and distortion in the air flow, which can affect the operation of the engine. Improvement is desirable.

SUMMARY

In one aspect, the disclosure describes an air intake for channeling a flow of ambient air toward an annular engine inlet of a gas turbine engine. The air intake has a reference axis that is substantially coaxial with the annular engine inlet when the air intake is installed on the gas turbine engine. The air intake comprises:

an intake inlet for receiving the flow of air therein, the intake inlet being generally axially facing and offset radially outwardly relative to the reference axis;

an intake duct in fluid communication with the intake inlet, the intake duct being configured to channel the flow of air received in the intake inlet;

a scroll portion in fluid communication with the intake duct and configured to channel the flow of air received from the intake duct, the scroll portion comprising a first scroll-shaped branch extending on one side of the reference axis and a second scroll-shaped branch extending on another side of the reference axis; and a strutted portion in fluid communication with the scroll portion, the strutted portion being configured to receive the flow of air from the scroll portion and channel the flow of air toward an intake outlet of the air intake for discharging the flow of air toward the annular engine inlet, the strutted portion comprising one or more struts defining one or more respective vanes for interacting with the flow of air.

In another aspect, the disclosure describes a gas turbine engine comprising an air intake as described herein.

In a further aspect, the disclosure describes an air intake for a turboprop gas turbine engine of an aircraft. The air intake is configured to channel air pushed aft by a propeller coupled to the gas turbine engine toward an engine inlet of the turboprop gas turbine engine. The air intake has a reference axis that is substantially coaxial with a longitudinal axis of the gas turbine engine when the air intake is installed on the gas turbine engine. The air intake comprises:

an intake inlet for receiving a flow of air therein from the air pushed aft by the propeller, the intake inlet being configured to be generally forward-facing relative to the gas turbine engine and offset radially outwardly relative to the reference axis;

an intake duct in fluid communication with the intake inlet, the intake duct being configured to channel the flow of air received in the intake inlet, at least part of the intake duct adjacent the intake inlet extending along an intake axis that is non-parallel to the reference axis, the intake axis being oriented toward a predetermined flow direction of the air pushed aft by the propeller upstream of the intake inlet during operation of the gas turbine engine, the intake axis being at an angle ($\beta 1$) that is greater than 0 degree and less than 5 degrees from the reference axis measured in a horizontal plane relative to the installed orientation of the air intake on the gas turbine engine; and an intake outlet in fluid communication with and downstream from the intake duct, the intake outlet being configured to discharge the flow of air toward the engine inlet.

Further details of these and other aspects of the subject matter of this application will be apparent from the detailed description and drawings included below.

DESCRIPTION OF THE DRAWINGS

Reference is now made to the accompanying drawings, in which:

FIG. 1 is a partial perspective view of an exemplary aircraft to which a gas turbine engine comprising an air intake as described herein is mounted;

FIG. 2 is shows a schematic axial cross-sectional view of an exemplary gas turbine engine comprising the air intake as described herein;

FIG. 3 is a perspective view of the air intake shown in FIG. 2;

FIG. 4A is a front elevation view of a strutted portion of the air intake of FIG. 3;

FIG. 4B is a side elevation view of the strutted portion of the air intake of FIG. 3;

FIG. 4C shows three cross-sectional profiles of an exemplary lower strut of the strutted portion of FIG. 4A;

FIG. 5 is a front elevation view of the air intake of FIG. 2;

FIG. 6A is a cross-sectional view of the air intake of FIG. 2 taken along line 6-6 in FIG. 5;

FIG. 6B shows an enlarged portion of the cross-sectional view of FIG. 6A showing an exemplary local depression;

FIG. 7 is a plot graphically illustrating an exemplary function used to define at least part of the air intake of FIG. 2;

FIG. 8 is a cross-sectional view of the air intake of FIG. 2 taken along line 8-8 in FIG. 5;

FIG. 9A shows superimposed internal cross-sectional profiles of an intake duct shown in FIG. 8 taken at line A-A and at line B-B in FIG. 8;

FIG. 9B shows superimposed internal cross-sectional profiles of the intake duct of FIG. 8 taken at line B-B and at line C-C in FIG. 8;

FIG. 10 shows a plot of an exemplary distribution of the cross-sectional area along a length of the intake duct of FIG. 8;

FIGS. 15A and 15B are partial axial cross-section views of the air intake illustrating the function of the bypass systems of FIGS. 13 and 14.

DETAILED DESCRIPTION

Figure 11:
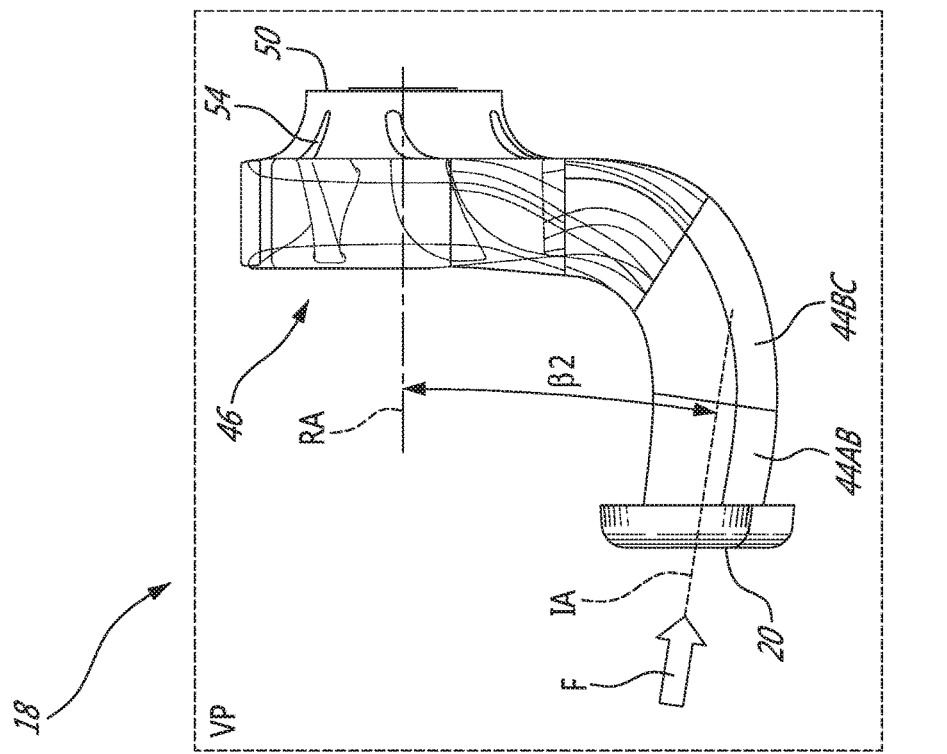
FIGS. 11 and 12 respectively show a top plan view of the air intake and a side elevation view of the air intake showing the orientation of an intake axis relative to a reference axis.

The present application relates to air intake systems for gas turbine engines such as, for example, turboprop and/or turboshaft gas turbine engines that are configured for use in aircraft applications. In various embodiments, the air intakes disclosed herein have a relatively streamlined internal flow passage to produce relatively low pressure losses and distortion (e.g., caused by wall friction, secondary flows and flow separation) in the air flow being channelled to compressors so as to improve the operation of associated gas turbine engines. In various embodiments, air intakes as disclosed herein may eliminate the need for relatively large plenums (dump boxes) that can be found on traditional air intakes and that can be the source of energy losses. Accordingly, in various embodiments, the air intakes disclosed herein may directly channel a flow of air to an inlet of the gas turbine engine instead of causing the air to accumulate into a large plenum before being discharged into the inlet of the gas turbine engine.

Although terms such as "maximize" and "minimize" may be used in the present disclosure, it is understood that such term may be used to refer to relative improvements, tuning and refinements which are not strictly limited to maximal and minimal conditions respectively.

Aspects of various embodiments are described through reference to the drawings.

FIG. 1 illustrates a portion of an exemplary aircraft 10 to which gas turbine engine 12 may be mounted. Aircraft 10 may include any suitable aircraft such as a fixed-wing or rotary-wing aircraft. For example, aircraft 10 may be a turboprop airliner. Gas turbine engine 12 may be a turboshaft or a turboprop gas turbine engine of known or other type and suitable for subsonic flight. Gas turbine engine 12 may, for example, be mounted to a wing of aircraft 10. In the example illustrated in FIG. 1, gas turbine engine 12 is a turboprop engine to which propeller 14 is coupled. Engine 12 may have a longitudinal axis LA (e.g., central axis). In various embodiments, longitudinal axis LA may correspond to an axis of rotation of propeller 14 and/or longitudinal axis LA may correspond to an axis of rotation of a low-pressure spool and/or a high-pressure spool of gas turbine engine 12. Gas turbine engine 12 may be housed in nacelle 16 serving as an aerodynamically-shaped covering for gas turbine engine 12.

Gas turbine engine 12 may comprise air intake 18 for channeling a flow of ambient air into gas turbine engine 12. Air intake 18 may comprise intake inlet 20 being generally axially-facing and offset radially outwardly (e.g., downwardly) relative to longitudinal axis LA of gas turbine engine 12. In some embodiments, intake inlet 20 may be generally forward-facing as shown in FIG. 1 so that air pushed in the aft direction (also known as "propeller wash") by propeller 14 during operation of gas turbine engine 12 may be received into intake inlet 20 and channeled into gas turbine engine 12 by air intake 18. However, in various embodiments, intake inlet 20 may be generally rear-facing in relation to gas turbine engine 12 or may be otherwise oriented depending on the particular application and installation constraints. As explained further below, air intake 18 may be configured to channel a flow of air received by intake inlet 20 radially inwardly relative to the longitudinal axis LA of gas turbine engine 12 with relatively low energy losses and relatively low pressure distortion in the flow of air.

FIG. 2 shows a schematic axial cross-section view of an exemplary gas turbine engine 12 of known or other type but comprising air intake 18 as described herein. Gas turbine engine 12 may have a direct-flow configuration. For example, gas turbine engine 12 may be of a type suitable for use in aircraft applications for subsonic flight generally comprising, in serial flow communication, air intake 18 through which ambient air is received, multistage compressor 22 for pressurizing the air, combustor 24 in which the compressed air is mixed with fuel and ignited for generating an annular stream of hot combustion gases, and turbine section 26 for extracting energy from the combustion gases. Gas turbine engine 12 may be used to power a load, which may include for example, a helicopter main rotor or one or more propellers 14 of aircraft 10. Alternatively, gas turbine engine 12 may be configured as an auxiliary power unit (APU) for use on an aircraft, or, gas turbine engine 12 may be used for a ground-based industrial application such as power generation and may be configured to operate as a turboshaft engine.

In various embodiments, gas turbine engine 12 may have a dual-spool configuration but it is understood that gas turbine engine 12 may not be limited to such configuration. For example, gas turbine engine 12 may comprise high-pressure spool 28 including one or more stages of multistage compressor 22 and one or more high-pressure turbines 30 of turbine section 26. Gas turbine engine 12 may also comprise low-pressure spool 32 including one or more stages of multistage compressor 22 and one or more low-pressure (i.e., power) turbines 34 of turbine section 26. Low-pressure spool 32 may be mechanically coupled to output shaft 36 via gears 38, to which propeller 14 may be coupled.

In various embodiments, air intake 18 may configured to channel the flow of ambient air represented by the arrow F toward engine inlet 42 of gas turbine engine 12. Engine inlet 42 may have a substantially annular shape and may be disposed upstream of compressor 22. For the purpose of description and reference with subsequent figures, air intake 18 may have a reference axis RA that is substantially coaxial with annular engine inlet 42 and/or substantially coaxial with longitudinal axis LA (e.g., center line) of gas turbine engine 12 when air intake 18 is installed on gas turbine engine 12. Engine inlet 42 may comprise an annular opening into which the flow of air discharged substantially axially rearwardly from intake outlet 50 is received upstream of compressor 22. In some embodiments, annular engine inlet 42 may be coaxial with longitudinal axis LA of gas turbine engine 12. In some embodiments, the longitudinal axis LA of gas turbine engine 12 may correspond to the axis or rotation of high-pressure spool 28 and of low-pressure spool 32 as shown in FIG. 2. Accordingly, in embodiments where an axis of rotation of propeller 14 is radially offset from an axis of rotation of high-pressure spool 28 and low-pressure spool 32 as shown in FIG. 2 for example, the longitudinal axis LA may not necessarily correspond to the axis of rotation of propeller 14. In various embodiments, reference axis RA may be substantially coaxial with annular intake outlet 50 of air intake 18.

Air intake 18 may comprise intake duct 44 in fluid communication with intake inlet 20 for receiving the flow of air F. In embodiments where intake inlet 20 is generally axially (e.g., forward- or rear-) facing and offset radially outwardly relative to reference axis RA, intake duct 44 and/or other part(s) of air intake 18 may be configured to channel the flow of air F received in intake inlet 20 radially inwardly relative to reference axis RA and toward (e.g., converging) scroll portion 46 of air intake 18. Scroll portion 46 may be in fluid communication with intake duct 44 and configured to receive the flow of air F from intake duct 44. Scroll portion 46 may be configured to channel the flow of air F toward strutted portion 53 for discharging the flow of air F toward engine inlet 42 via intake outlet 50. Scroll portion 46 may define one or more converging quasi scroll-shaped passages configured to cause acceleration and redirection of the flow of air F toward engine inlet 42 with relatively low energy losses and pressure distortion. Optional inlet screen 52 (shown schematically in FIGS. 2, 5 and 16) may be disposed in a flow path defined in air intake 18. In some embodiments, inlet screen 52 may be disposed inside air intake 18 between scroll portion 46 and strutted portion 53. Inlet screen 52 may comprise a metallic screen configured to substantially prevent foreign objects (e.g., pieces of ice) larger than a certain size from exiting intake outlet 50. Screen 52 may also serve as a surface on which ice is permitted to accrete thereby preventing or reducing the likelihood of ice accreting further downstream into gas turbine engine 12.

FIG. 3 is a perspective view of air intake 18. In some embodiments, intake inlet 20 and part(s) of intake duct 44 may have a generally bean or kidney-shaped cross-sectional profiles as shown in FIG. 3. The kidney-shaped cross-section may be substantially symmetrical about a vertical plane oriented along reference axis RA. Alternatively, the kidney-shaped cross-section may be asymmetrical. The kidney-shaped profiles may facilitate the control (e.g., reduction) of secondary flows of the flow of air F passing through air intake 18 and hence contribute to the reduction of energy losses.

Air intake 18 may comprise strutted portion 53 (e.g., strutted case) comprising one or more struts 54 extending between a first (e.g., generally forward-facing) wall of strutted portion 53 and a second (e.g., opposite, generally rear-facing) wall of strutted portion 53 so as to extend across one or more flow passages defined inside of air intake 18. In some embodiments, struts 54 may be hollow and form passages extending through strutted portion 53. Alternatively, struts 54 may be solid. Struts 54 may be circumferentially spaced apart about reference axis RA. In some embodiments, strutted portion 53 may be considered part of the definition of gas turbine engine 12 and the remainder of air intake 18 may be considered part of the aircraft or nacelle definition. For example, strutted portion 53 may be a separate part that may be (e.g., removably) coupled with scroll portion 46.

Scroll portion 46 may comprises first scroll-shaped branch 46A extending on one side of reference axis RA and second scroll-shaped branch 46B extending on another side of reference axis RA. For example, the flow of air F channelled into intake duct 44 may be split into two or more sub flows depending on the configuration of scroll portion 46 and struts 54. For example, a plurality of flow passages extending toward intake outlet 50 may be defined between struts 54 of strutted portion 53. The radially outer flow passages defined by scroll-shaped branches 46A and 46B may be generally quasi scroll-shaped where first scroll-shaped branch 46A and second scroll-shaped branch 46B may converge at a location diametrically opposed to intake duct 44 relative to reference axis RA. For example, in relation to reference axis RA, intake duct 44 may be disposed generally at 6 o'clock (i.e., lower orientation) while the merging location of first scroll-shaped branch 46A and second scroll-shaped branch 46B may be generally at 12 o'clock (i.e., upper orientation). In some embodiments, first scroll-shaped branch 46A and second scroll-shaped branch 46B may converge at a location other than 12 o'clock relative to intake duct 44 and reference axis RA. Accordingly, the location of flow separator 56 may also be different than that shown in the figures.

Due to the quasi scroll-shaped configuration of first scroll-shaped branch 46A and second scroll-shaped branch 46B, the merging of first scroll-shaped branch 46A and second scroll-shaped branch 46B may define a flow separator (splitter) 56 disposed substantially at the merging location of first scroll-shaped branch 46A and second scroll-shaped branch 46B. Flow separator 56 may comprise a radially inwardly extending depression (dip) in the outer shape of scroll portion 46 between first scroll-shaped branch 46A and second scroll-shaped branch 46B. Flow separator 56 may be configured to keep the air flows from first scroll-shaped branch 46A and second scroll-shaped branch 46B separate over some distance as the flows from first scroll-shaped branch 46A and second scroll-shaped branch 46B are channelled toward engine inlet 42. Flow separator 56 and the vanes defined by struts 54 may each serve to channel part of the air flow radially inwardly and also axially rearwardly relative to reference axis RA to as to discharge the flow of air F into engine inlet 42 at an orientation that is favorable to compressor 22 and to the operation of gas turbine engine 12. Accordingly, in comparison with traditional air intakes that have plenums (i.e., dump boxes) into which air is collected and pressurized prior to being delivered to the engine, air intake 18 as disclosed herein may be configured to provide one or more relatively streamlined internal passages serving to directly channel the flow or air from intake inlet 20 to intake outlet 50 with relatively low secondary flows, pressure distortions and energy losses imparted on the flow of air F.

FIG. 4A is a front elevation view of strutted portion 53 shown in FIG. 3 in isolation and FIG. 4B is a side elevation view of strutted portion 53 shown in FIG. 3 in isolation. The one or more struts 54 of strutted portion 53 may correspondingly define one or more vanes for interacting with the flow of air F inside of air intake 18 being channelled toward engine inlet 42. The vanes defined by struts 54 may be configured to direct the flow of air F so as to promote an efficient flow with relatively low energy losses and pressure distortion. The vanes may guide the flow of air F toward intake outlet 50, which may have a substantially annular shape that substantially matches (e.g., is coextensive with) the annular shape of engine inlet 42 so as to permit an efficient transfer of air from intake outlet 50 into engine inlet 42. In some embodiments, the vanes defined by struts 54 may instead or in addition be configured to prevent or reduce swirling movement in the flow of air F exiting scroll portion 46 so as to promote efficient flow with relatively low energy losses in the flow of air F. Accordingly, the vanes defined by struts 54 may be de-swirl vanes and/or flow guidance vanes of known or other types. For example, one or more of the vanes defined by struts 54 may be cambered and/or twisted to direct the flow of air F accordingly. In some embodiments, the flow of air F that is discharged from intake outlet 50 may be oriented generally along reference axis RA (i.e., oriented axially) so as to efficiently interact with guide vanes and/or blades of compressor 22 of gas turbine engine 12.

FIG. 4C shows three cross-sectional profiles 55A-55C of an exemplary lower strut 54A identified in FIG. 4A. The cross-sectional profiles 55A-55C may represent cross-sectional profiles of strut 54A defining the shape of the vane defined by strut 54A and extending through strutted portion 53. The cross-sectional profiles 55A-55C are viewed in the same orientation as in FIG. 4A. As shown in FIG. 4C, strut 54A may have a varying cross-sectional profile and also a varying cross-sectional area along its height/length along reference axis RA. In the example shown, cross-sectional profile 55A may be located at or near an inner hub of compressor 22 and cross-sectional profile 55C may be located at or near an outer shroud of compressor 22. Relative to reference axis RA in FIG. 4B, cross-sectional profile 55A may be disposed forward of cross-sectional profile 55C. Cross-sectional profile 55B may be disposed (e.g., half way) between cross-sectional profile 55A and cross-sectional profile 55C.

Struts 54B and 54C may similarly have varying cross-sectional profiles and also varying cross-sectional areas along their heights/lengths. Struts 54A-54C may each be configured according to the flow conditions at their respective positions and therefore may define vanes of different shapes for interacting with the flow of air from first scroll-shaped branch 46A. However, in the embodiment illustrated in the figures, struts substantially identical to struts 54A-54C may also be provided and disposed on the side of second scroll-shaped branch 46B so that scroll branches 46A and 46B of scroll portion 46 may be substantially symmetrical about a vertical plane extending along and through reference axis RA. Alternatively, the shape and arrangement of struts 54 may be different that those shown in the figures. For example, the shape and arrangement of struts 54 may be asymmetrical between the side of first scroll-shaped branch 46A and the side of second scroll-shaped branch 46B of scroll portion 46.

FIG. 5 illustrates a front elevation view of air intake 18 showing the kidney-shaped intake inlet 20 and struts 54 being circumferentially distributed about reference axis RA, which is perpendicular to the page. Air intake 18 may also comprise intake bore 58 configured to accommodate the passage of low-pressure shaft 32A of low-pressure spool 32 through air intake 18 as shown in FIG. 2. In various embodiments, intake inlet 20, while being radially offset (e.g., downwardly) from reference axis RA, may be laterally aligned with reference axis RA. Alternatively, as explained below, intake inlet 20 may be radially offset (e.g., downwardly) from reference axis RA and may also be laterally offset from reference axis RA to accommodate an incoming direction of flow of air F (e.g., propeller wash) into intake duct 44. FIG. 5 also shows the location of screen 52 (as a stippled line), which may be disposed inside of air intake 18. The location of screen 52 may also correspond to an interface between scroll portion 46 and strutted portion 53.

FIG. 6A is a cross-sectional view of air intake 18 taken along line 6-6 in FIG. 5. In some embodiments, first scroll-shaped branch 46A may define first inner passage 60A and second scroll-shaped branch 46B may define a corresponding second inner passage 60B for channelling the flow of air F toward strutted portion 53. First inner passage 60A may be at least partially defined by first radially outer passage wall 62A. Second inner passage 60B may be at least partially defined by second radially outer passage wall 62B. First and second inner passages 60A and 60B may be substantially mirror images of each other (i.e., symmetrical) in relation to a vertical plane extending along and through reference axis RA.

FIG. 6B shows an enlarged portion of the cross-sectional view of FIG. 6A where an exemplary local depression 57 is shown. Such local depressions 57 may be incorporated into intake duct 44 to control local flow separation.

FIG. 7 is a plot illustrating an exemplary function used to define at least part of the shape of scroll portion 46. For example, radially outer passage walls 62A and 62B of respective first scroll-shaped branch 46A and second scroll-shaped branch 46B may each converge radially inwardly relative to the reference axis RA along a streamwise direction to form a quasi-scroll shape. Accordingly, the radial distance from each outer passage wall 62A, 62B may progressively decrease along a streamwise direction of each respective inner passage 60A, 60B as illustrated in FIG. 5.

In some embodiments, the shape of each radially outer passage wall 62A, 62B may be defined according to an Archimedean spiral function however it is understood that other types of functions may be suitable to provide relatively streamlined inner passages 60A, 60B for channelling the flow of air F.

The plot of FIG. 7 illustrates an exemplary relationship between the inner and outer radial dimensions A and B, relative to reference axis RA, of radially outer passage walls 62A or 62B as a function of angular position θ about reference axis RA. In reference to FIG. 7, A represents the inner radius of radially outer passage walls 62A, 62B, B represents the outer radius of radially outer passage walls 62A, 62B, d1 represents the outer radius of radially outer passage walls 62A, 62B at the top of scroll portion 46 of air intake 18 and d2 represents the outer radius of radially outer passage wall 62A, 62B at a lateral position of scroll portion 46. The shape and configuration of scroll portion 46 may promote a uniform flow distribution out of intake outlet 50.

FIG. 8 is a cross-sectional view of air intake 18 taken along line 8-8 in FIG. 5. In various embodiments, intake duct 44 may be configured to channel the flow of air F generally rearwardly and/or radially inwardly relative to reference axis RA. In some embodiments, intake duct 44 may be formed to provide a smooth (gradual), streamlined and efficient transition between the kidney-shaped intake inlet 20 and the plenum-shaped cross-sectional profile at line C-C (e.g., entrance to scroll portion 46). Accordingly, intake duct 44 may be configured to efficiently distribute and feed the flow of air F into parts of scroll portion 46.

In some embodiments, intake duct 44 may comprise first duct portion 44AB that channels the flow of air F at least partially rearwardly. Second duct portion 44BC may comprise a bend that causes the flow of air F to change direction and be channelled generally radially inwardly toward scroll portion 46. The radius of the bend may be selected to minimize energy losses and pressure distortion in the flow of air F. First duct portion 44AB may be disposed proximal to intake inlet 20 and may extend along intake axis IA. In some embodiments, first duct portion 44AB may be generally straight. In some embodiments, intake axis IA may be substantially parallel to reference axis RA. Alternatively, as explained further below and as shown in FIG. 8, intake axis IA may be non-parallel to reference axis RA. In some embodiments, second duct portion 44BC may be disposed downstream of first duct portion 44AB and accordingly may be configured to receive the flow or air F from first duct portion 44AB in a direction substantially along intake axis IA and redirect the flow of air F radially inwardly toward (e.g., substantially perpendicular to) reference axis RA. Depending on the orientation of intake axis IA, the change in flow direction imparted by second duct portion 44BC may be less than 90 degrees, about 90 degrees or more than 90 degrees.

Depending on the specific installation constraints, intake duct 44 may have a different shape than that shown herein and may, for example, comprise additional bends. In some embodiments, inner passages 60A and 60B defined by first scroll-shaped branch 46A and second scroll-shaped branch 46B may be asymmetrical and the position and configuration of flow separator 56 may be different than that shown herein.

FIG. 9A shows internal cross-sectional profiles of intake duct 44 at line A-A and at line B-B being superimposed to illustrate differences. In some embodiments, both profiles A-A and B-B may be generally kidney-shaped. However, profiles A-A and B-B may be of different sizes so as to define different internal cross-sectional areas at locations A-A and B-B. For example, in some embodiments, first duct portion 44AB may be configured to cause some diffusion of the flow of air F entering intake inlet 20 by progressively causing the cross-sectional area for the flow of air F to increase from location A-A to location B-B. In some embodiments, the ratio (i.e., diffusion ratio) of the internal cross-sectional area at location B-B over the internal cross-sectional area at location A-A may be about 1.15 or greater. In some embodiments, the ratio of the internal cross-sectional area at location B-B over the internal cross-sectional area at location A-A may be between about 1.15 and about 1.25. In some embodiments, the ratio of the internal cross-sectional area at location B-B over the internal cross-sectional area at location A-A may be less than 2.0. In various embodiments, the ratio of the internal cross-sectional area at location B-B over the internal cross-sectional area at location A-A may be selected to maximize pressure recovery and minimize flow separation that could lead to flow distortion. In various embodiments, the ratio of the internal cross-sectional area at location B-B over the internal cross-sectional area at location A-A may be dependent on a length of first duct portion 44AB along intake axis IA. The diffusion in the flow of air F caused by the increasing cross-sectional area along first duct portion 44AB may facilitate the redirection of the flow of air F along second duct portion 44BC with reduced energy losses.

FIG. 9B show internal cross-sectional profiles of intake duct 44 at line B-B and at line C-C being superimposed to illustrate differences. In some embodiments, profile B-B may be generally kidney-shaped but profile C-C may not necessarily be kidney-shaped. Also, the difference in internal cross-section area between profiles B-B and C-C may be less significant than the difference in internal cross-section area between profiles A-A and B-B shown in FIG. 9A. Accordingly, in addition to redirecting the flow of air F radially inwardly, second duct portion 44BC may also cause the cross-sectional shape of the flow of air F to progressively transition from that of profile B-B to that of profile C-C for preparing the flow of air F for entrance into scroll portion 46. In some embodiments, the difference in internal cross-sectional area between location B-B and location C-C may not be significant. In some embodiments, second duct portion 44BC may cause little to no diffusion of the flow of air F. For example, second duct portion 44BC may exhibit a diffusion ratio of about one (1). In some embodiments, second duct portion 44BC may be converging.

FIG. 10 shows a plot of an exemplary distribution of cross-sectional area along a length of intake duct 44 showing the referenced locations A-A, B-B and C-C on the plot.

Figure 12:
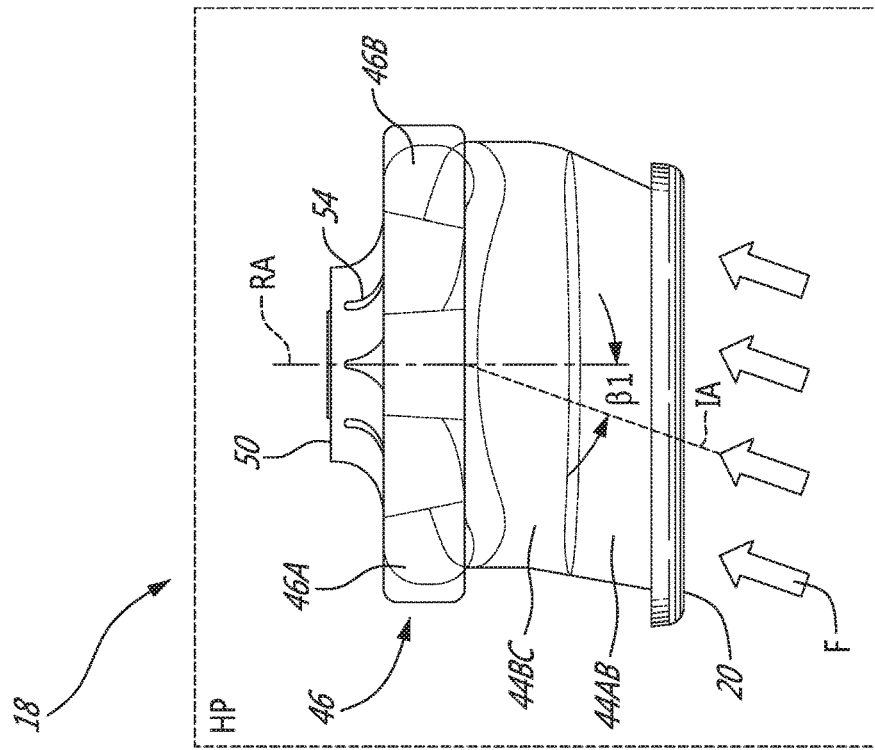

FIGS. 11 and 12 respectively show a top plan view of air intake 18 and a side elevation view of air intake 18 showing the orientation of intake axis IA relative to reference axis RA. As mentioned above, intake axis IA may be non-parallel to reference axis RA. For example, in some embodiments, intake axis IA may be oriented toward the direction of the propeller wash so as to minimize flow disruptions and associated energy losses in the flow of air F entering intake inlet 20 and flowing along intake duct 44.

FIG. 11 shows a horizontal plane HP relative to the installed orientation of air intake 18 on gas turbine engine 12. Horizontal plane HP may be substantially parallel to reference axis RA so that horizontal plane HP extends laterally across air intake 18. FIG. 12 shows a vertical plane VP relative to the installed orientation of air intake 18 on gas turbine engine 12. Vertical plane VP may also be substantially parallel to reference axis RA but extend in the forward-aft direction across air intake 18.

In some embodiments, intake inlet 20 may be generally forward-facing in relation to gas turbine engine 12 and first duct portion 44AB may be oriented toward a flow direction of the mass of air being pushed aft by propeller 14 (i.e., propeller wash) during at least one mode of operation of gas turbine engine 12. Such mode of operation may be a situation where propeller 14 is driven to generate thrust and thereby causes a mass of air to be propelled aft generally along a flow direction that is non-parallel to reference axis RA as shown in FIGS. 11 and 12 due to the interaction between the rotating propeller 14 and the mass of air. In some embodiments, such mode of operation may include taxi, take-off, cruise and/or other phases of flight of aircraft 10 for example.

It is understood that intake inlet 20 may be oriented toward a flow of an incoming mass of air other than propeller wash. For example, the direction of such mass of air may be different for different applications depending on the orientation of gas turbine engine 12 relative to such direction. Such different applications may include turboshaft applications, APU applications or a gas turbine engine having a pusher configuration where the propeller is mounted behind the engine.

It is understood that the flow direction of the propeller wash will be different for different sizes and types (e.g., number of blades) of propellers 14 and also depending on the operating condition (e.g., speed and pitch) of propeller 14. Accordingly, first duct portion 44AB may be oriented to accommodate a predetermined propeller wash flow direction upstream of intake inlet 20 based on a propeller type and operating condition(s) of interest. For example, first duct portion 44AB may be oriented differently for different installations based on a specific propeller wash flow direction. In some embodiments, first duct portion 44AB may be oriented based on a predetermined propeller wash flow direction estimated to occur during a (e.g., cruise) phase of flight for a particular installation of gas turbine engine during which gas turbine engine 12 is operated for longer periods of time. Such predetermined propeller wash may be derived (e.g., computed) mathematically or empirically (e.g., experimental measurement). In some embodiments, first duct portion 44AB may be oriented based on a range of propeller wash flow directions of interest. Accordingly, first duct portion 44AB may be oriented to be substantially parallel to the propeller wash flow direction of interest so that flow of air F may be received into air intake 18 substantially head-on so as to reduce disturbances to the flow of air F as it enters and flows into intake duct 44.

In various embodiments, intake axis IA along which first duct portion 44AB may extend may be oriented at a single angle or at a compound angle from reference axis RA so that intake axis IA may be non-parallel to reference axis RA. For example, in some embodiments, intake axis IA may be at a first non-zero angle (β1) from reference axis RA as measured in horizontal plane HP relative to the installed orientation of air intake 18 on gas turbine engine 12. Alternatively or in addition, intake axis IA along which first duct portion 44AB extends may be at a second non-zero angle (β2) from reference axis RA as measured in vertical plane VP relative to the installed orientation of air intake 18 on gas turbine engine 12. Accordingly, the position of intake inlet 20 may be laterally offset relative to reference axis RA as seen in horizontal plane HP of FIG. 11. In some embodiments, first duct portion 44AB may extend downwardly in the streamwise direction to accommodate a propeller wash flow direction that is divergent from reference axis RA.

In some embodiments, intake axis IA may, for example, be oriented at an angle (β1) that is greater than 0 degree and less than 5 degrees from reference axis RA measured in horizontal plane HP relative to the installed orientation of air intake 18 on gas turbine engine 12. In various embodiments, angle (β1) may be greater than 0 degree and less than 15 degrees. Alternatively or in addition, intake axis IA may in some embodiments be oriented at an angle (β2) that is greater than 0 degree and less than 30 degrees from reference axis RA measured in vertical plane VP extending along reference axis RA relative to the installed orientation of air intake 18 on gas turbine engine 12. In some embodiments, angle (β2) may be about 12 degree. It is understood that the numerical values for angles provided herein are intended to be absolute angular values relative to reference axis RA and are therefore not limited to a specific angular direction relative to reference axis RA.

Figure 14:
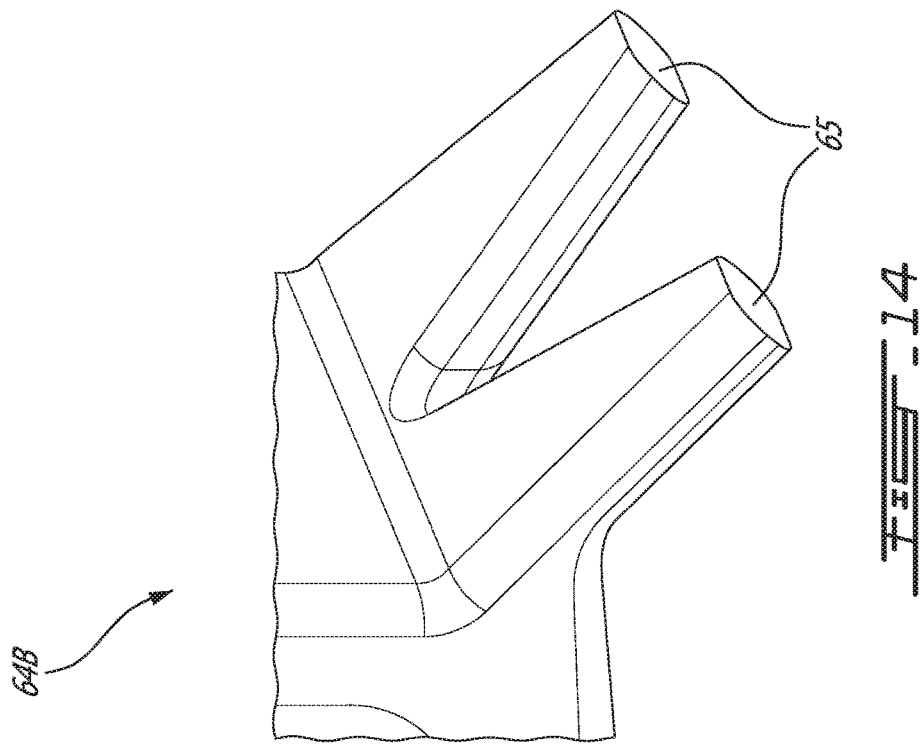
FIGS. 13 and 14 are perspective views of part of exemplary bypass systems that can be incorporated into the air intakes described herein.
Figure 13:
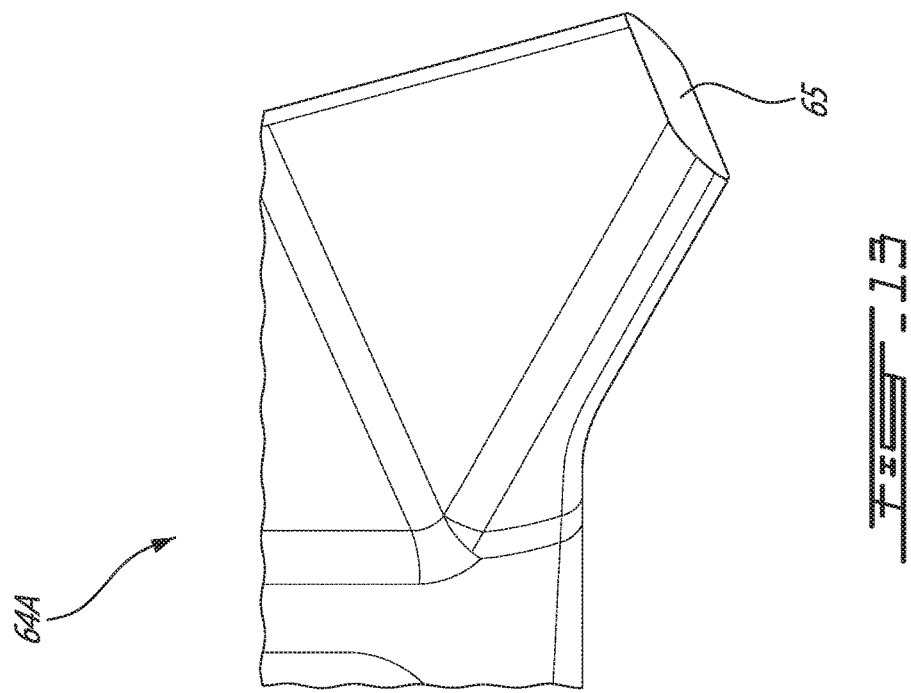

FIGS. 13 and 14 are perspective views of part of exemplary bypass systems 64A and 64B respectively that can be incorporated into air intake 18 described herein. In addition to directing the flow or air F into gas turbine engine 12, air intake 18 may be configured to protect gas turbine engine 12 from the injection of foreign objects such as water, icing particles and larger debris. This can be achieved with bypass systems 64A or 64B which rely on inertia particle separation that separates the foreign particles from the flow of air F by accelerating the particles and directing them with inertia to one or more bypass outlets 65. FIG. 13 shows part of bypass system 64A comprising a single bypass outlet 65 and FIG. 14 shows part of bypass system 64B having a bifurcated arrangement comprising two bypass outlets 65.

FIGS. 15A and 15B show partial axial cross-section views of air intake 18 to illustrate the function of bypass system 64A and/or bypass system 64B. Bypass system 64A, 64B may comprise one or more deployable/retractable vanes 66 that may serve to alter the flow conditions inside of intake duct 44 so as to cause particles to exit bypass outlet(s) 65 by way of inertia particle separation. The use of deployable vane(s) 66 may facilitate the removal of smaller particles such as icing particles. It is understood that fixed (i.e., non-retractable) vanes 66 could also be used to provide foreign object protection however the use of retractable vanes 66 may have less of an impact on the flow of air flowing through air intake 18 when such vanes 66 are retracted.

FIG. 15A shows deployable vanes 66 as being retracted and FIG. 15B shows deployable vanes 66 as being deployed in a situation where foreign object protection is provided. When stowed/retracted, deployable vanes 66 may substantially prevent the flow or air F from exiting air intake 18 via bypass outlet 65 as shown in FIG. 15A. However, when deployable vanes 66 are deployed, some of the flow of air F may be directed out of bypass outlet 65 as shown in FIG. 15B. Deployable vanes 66 may be actuated by suitable known or other type of actuator (not shown) and may be controlled via a suitable controller (e.g., electronic engine controller) on gas turbine engine 12 according to known or other methods. Vanes 66 may be configured to minimize their effect on the flow of air F when retracted so as to not cause significant energy losses. Vanes 66 may be selectively kept retracted or deployed based on when foreign object protection is desired or required.

Figure 16:
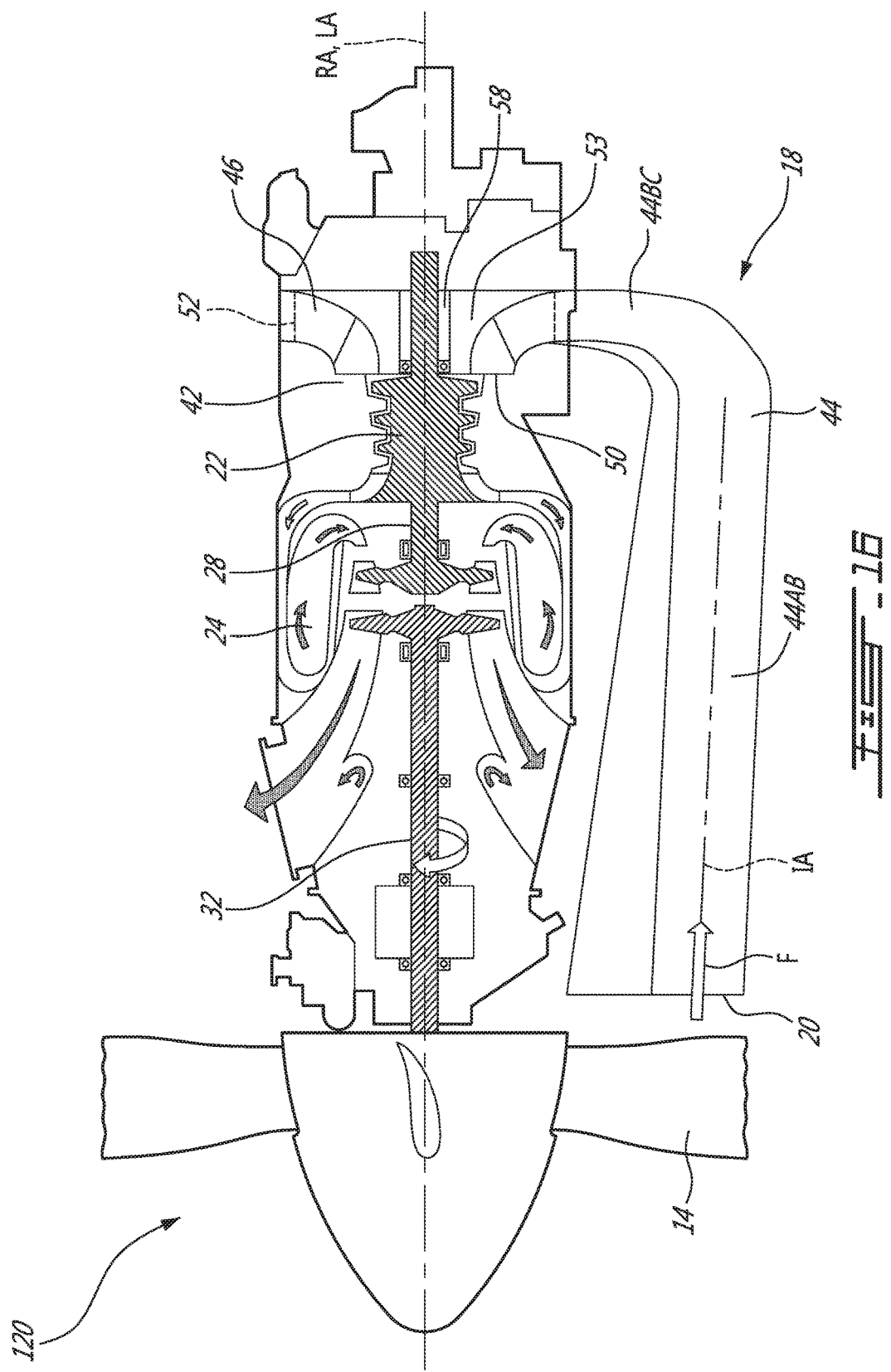
FIG. 16 shows a schematic axial cross-section view of another exemplary gas turbine engine comprising another exemplary air intake as described herein.

FIG. 16 shows a schematic axial cross-section view of another exemplary gas turbine engine 120 of turboprop type and comprising air intake 18 as described herein. Gas turbine engine 120 of FIG. 16 may have a dual-spool configuration but contrary to the gas turbine engine 12 of FIG. 2, low-pressure spool 32 and high-pressure spool 28 may be coaxial and disposed end to end instead of one inside of the other. In the embodiment of FIG. 16, propeller 14 may have an axis of rotation that is substantially coaxial with reference axis RA of air intake 18 and also with longitudinal axis LA of gas turbine engine 120. Also, gas turbine engine 120 of FIG. 16 may have a reverse-flow configuration where engine inlet 42 is disposed in a rear portion instead of in a forward portion of gas turbine engine 12 and where engine inlet 42 consequently receives the flow of air F substantially axially in a forward direction.

Air intake 18 of FIG. 16 may generally have the same elements previously described above and therefore the description of such elements is not repeated below. It is understood that aspects of embodiments of air intake 18 described above are equally applicable to the embodiment of air intake 18 shown in FIG. 16. Accordingly, like elements have been labelled using like reference numerals.

Due to the reverse-flow configuration of gas turbine engine 120 of FIG. 16, first duct portion 44AB of intake duct 44 may be longer than for gas turbine engine 12 in order to channel the flow of air F over a greater distance to accommodate the position of engine inlet 42 near the rear of gas turbine engine 120. Also, the orientation of strutted portion 53 may be reversed relative to intake duct 44 in order to discharge the flow of air F in a forward direction into compressor 22.

During operation, air intake 18 may be installed on gas turbine engine 12 or 120 and used to channel a flow of air to engine inlet 42 with relatively low energy losses and flow distortion (e.g., swirl and pressure distortions). Air intake 18 may define a generally streamlined flow path between intake inlet 20 and intake outlet 50. For example, in some embodiments, air intake 18 may not comprise a plenum (i.e., dump box) often found in traditional air intakes and which may cause significant energy losses. In various embodiments, improvements of flow characteristics of the flow or air F may improve engine performance in comparison with some other traditional air intakes.

In some embodiments, the construction of air intake 18 may result in a more efficient use of space in comparison with other air intakes that have relatively large plenums. Such reduction in size may result in weight reduction.

In various embodiments, air intake 18 may be fabricated according to known or other manufacturing methods using suitable sheet metal or polymeric material. In some embodiments, air intake 18 or part(s) thereof may be cast using a suitable metallic material or molded from a suitable polymeric material. In some embodiments, air intake 18 may comprise a plurality of components (e.g., pieces of sheet metal) pieced (e.g., welded) together to form air intake 18. For example, strutted portion 53 may be manufactured separately and subsequently assembled with scroll portion 46. Alternatively, in some embodiments, intake inlet 20, intake duct 44, scroll portion 46 and strutted portion 53 may integrally formed to have a unitary (i.e., single-piece) construction.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. Also, one skilled in the relevant arts will appreciate that while the air intakes and gas turbine engines disclosed and shown herein may comprise a specific number of elements/components, the air intakes and gas turbine engines could be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An air intake for channeling a flow of ambient air toward an annular engine inlet of a gas turbine engine, the air intake having a reference axis that is substantially coaxial with the annular engine inlet when the air intake is installed on the gas turbine engine, the air intake comprising:
   an intake inlet for receiving the flow of air therein, the intake inlet being generally axially facing and offset radially outwardly relative to the reference axis;
   an intake duct in fluid communication with the intake inlet, the intake duct being configured to channel the flow of air received in the intake inlet;
   a scroll portion in fluid communication with the intake duct and configured to channel the flow of air received from the intake duct, the scroll portion comprising a first scroll-shaped branch extending on one side of the reference axis and a second scroll-shaped branch extending on another side of the reference axis; and
   a strutted portion in fluid communication with the scroll portion, the strutted portion being configured to receive the flow of air from the scroll portion and channel the flow of air toward an intake outlet of the air intake for discharging the flow of air toward the annular engine inlet, the strutted portion comprising one or more struts defining one or more respective vanes for interacting with the flow of air.

2. The air intake as defined in claim 1, wherein the one or more struts define de-swirl vanes.

3. The air intake as defined in claim 1, wherein the one or more struts comprise a first strut and a second strut respectively defining a first vane and a second vane for interacting with the flow of air from the first scroll-shaped branch, the first strut and the second strut being circumferentially spaced apart about the reference axis, the first vane and the second vane having different shapes.

4. The air intake as defined in claim 1, wherein the first scroll-shaped branch and the second scroll-shaped branch merge together and a flow separator is disposed substantially at a merging location of the first scroll-shaped branch and the second scroll-shaped branch.

5. The air intake as defined in claim 4, wherein the merging location is diametrically opposed to the intake duct relative to the reference axis.

6. The air intake as defined in claim 1, wherein each of the first scroll-shaped branch and the second scroll-shaped branch defines an inner passage for channeling the flow of air, the inner passage being at least partially defined by a radially outer passage wall, the radially outer passage wall converging radially inwardly relative to the reference axis and along a streamwise direction of the air intake.

7. The air intake as defined in claim 6, wherein a shape of the radially outer passage wall is at least partially defined based on an Archimedean spiral function.

8. The air intake as defined in claim 1, wherein:
   at least part of the intake duct adjacent the intake inlet extends along an intake axis that is non-parallel to the reference axis; and
   the intake axis is oriented to be substantially parallel to a predetermined flow direction of an incoming mass of air, the intake axis being at an angle ($\beta 1$) that is greater than 0 degree and less than 5 degrees from the reference axis measured in a horizontal plane relative to the installed orientation of the air intake on the gas turbine engine.

9. The air intake as defined in claim 8, wherein the intake duct has a first internal cross-sectional area at a first location proximal to the intake inlet and a second internal cross-section area at a second location downstream of the first location and along the intake axis, a ratio of the second internal cross-section area over the first internal cross-sectional area being between about 1.15 and about 1.25.

10. The air intake as defined in claim 8, wherein the intake duct has a first internal cross-sectional area at a first location proximal to the intake inlet and a second internal cross-section area at a second location downstream of the first location and along the intake axis, a ratio of the second internal cross-section area over the first internal cross-sectional area being less than 2.0.

11. The air intake as defined in claim 10, wherein the intake duct has a cross-sectional profile at the second location downstream of the first location that is kidney-shaped.

12. The air intake as defined in claim 11, wherein the intake inlet has a cross-sectional profile that is kidney-shaped.

* * * * *